United States Patent
Laming et al.

(10) Patent No.: US 6,466,311 B1
(45) Date of Patent: Oct. 15, 2002

(54) FABRICATING OPTICAL WAVEGUIDE GRATINGS AND/OR CHARACTERISING OPTICAL WAVEGUIDES

(75) Inventors: Richard Ian Laming, Edinburgh (GB); Michael Kevan Durkin, Worcestershire (GB); Morten Ibsen, Hampshire (GB)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/556,691

(22) Filed: Apr. 21, 2000

Related U.S. Application Data (63) Continuation of application No. PCT/GB98/03175, filed on Oct. 23, 1998.

(30) Foreign Application Priority Data

Oct. 24, 1997 (GB) .............................................. 9722549

(51) Int. Cl.⁷ .............................................. G01N 21/00
(52) U.S. Cl. ...................................... 356/73.1; 385/37
(58) Field of Search ........................ 356/73.1; 385/10, 385/37, 123, 31–33; 359/569, 558, 566, 573; 372/26, 28

(56) References Cited

U.S. PATENT DOCUMENTS

| | | | |
|---|---|---|---|
| 4,280,827 A | 7/1981 | Murphy et al. | |
| 4,307,296 A | 12/1981 | Presby | |
| 5,309,221 A | 5/1994 | Fischer et al. | |
| 5,355,209 A | 10/1994 | Grosso | |
| 5,420,948 A | 5/1995 | Byron | |
| 5,661,553 A | 8/1997 | Auge et al. | |
| 5,666,224 A | 9/1997 | Wood et al. | |
| 5,881,197 A | * 3/1999 | Dong et al. .................. | 385/127 |
| 5,912,999 A | * 6/1999 | Brennan, III et al. ......... | 385/37 |

FOREIGN PATENT DOCUMENTS

| | | |
|---|---|---|
| GB | 2 295 689 | 6/1996 |
| WO | WO 96/26458 | 8/1996 |
| WO | WO 96/36895 | 11/1996 |

OTHER PUBLICATIONS

M. Ikeda, "Optical Fiber Dispersively Delayed Equalizer and its Production", Patent Abstracts of Japan, Abstract of JP 56 164305, (1981).

* cited by examiner

*Primary Examiner*—Frank G. Font
*Assistant Examiner*—Tu T. Nguyen
(74) *Attorney, Agent, or Firm*—Finnegan, Henderson, Farabow, Garrett & Dunner, LLP (57) ABSTRACT

An optical waveguide grating if formed in a waveguide of nominally uniform diameter. A grating characteristic is varied at positions along the grating in a substantially inverse relationship to the diameter of the waveguide at those positions.

9 Claims, 8 Drawing Sheets

FABRICATING OPTICAL WAVEGUIDE GRATINGS AND/OR CHARACTERISING OPTICAL WAVEGUIDES

This application is a continuation of International Application No. PCT/GB98/03175, filed Oct. 23, 1998, the content of which is incorporated herein by reference.

This invention relates to methods and apparatus for fabricating optical waveguide gratings, such as optical fibre gratings, and/or characterising optical waveguides, such as optical fibres.

Optical fibre Bragg gratings are one of the most promising areas of research and development in fibre optic systems. Many systems rely on the precise wavelength selective capability of Bragg gratings such as lasers and sensors and more systems are likely to take advantage of high quality gratings in the near future.

Probably the biggest incursion of the fibre Bragg grating has been in telecommunication systems and especially in dispersion compensation. Chirped fibre gratings are particularly well suited to dispersion compensation as they are compact, exhibit low loss, are highly dispersive and are not subject to the non-linear effects which afflict specialised dispersion shifted and dispersion compensating fibres. Transmission experiments incorporating fibre gratings for dispersion compensation have successfully been demonstrated many times. Potentially the performance of fibre gratings could be further enhanced in dispersion compensation systems with more precise control over the dispersion profile. in particular a reduction in time delay ripples and addition of third order compensation. required for higher bit-rate systems.

Figure 7A:
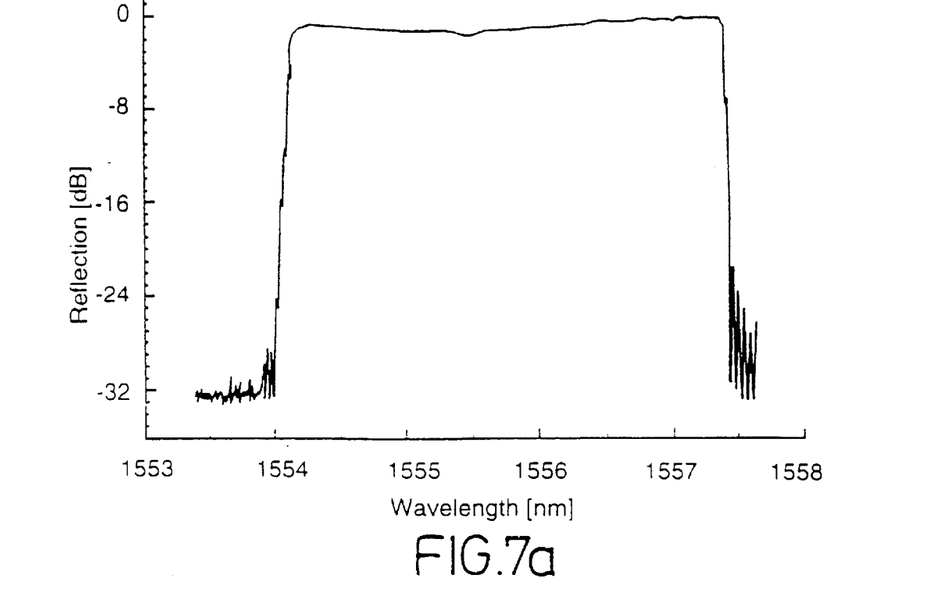
FIGS. 7a to 7d illustrate deviations from the expected performance of a nominally linearly chirped grating.
Figure 7B:
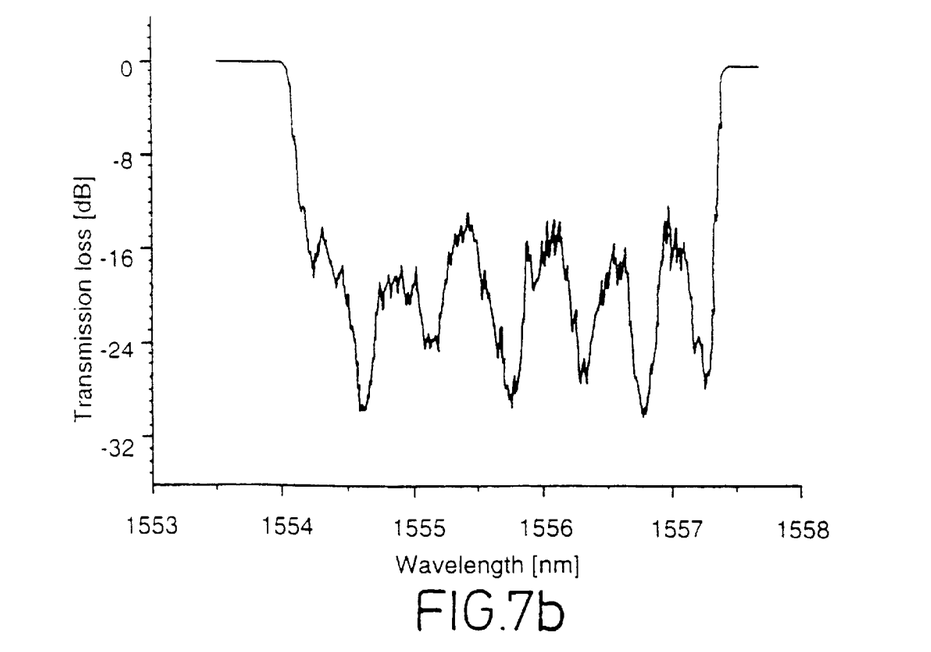
Figure 7C:
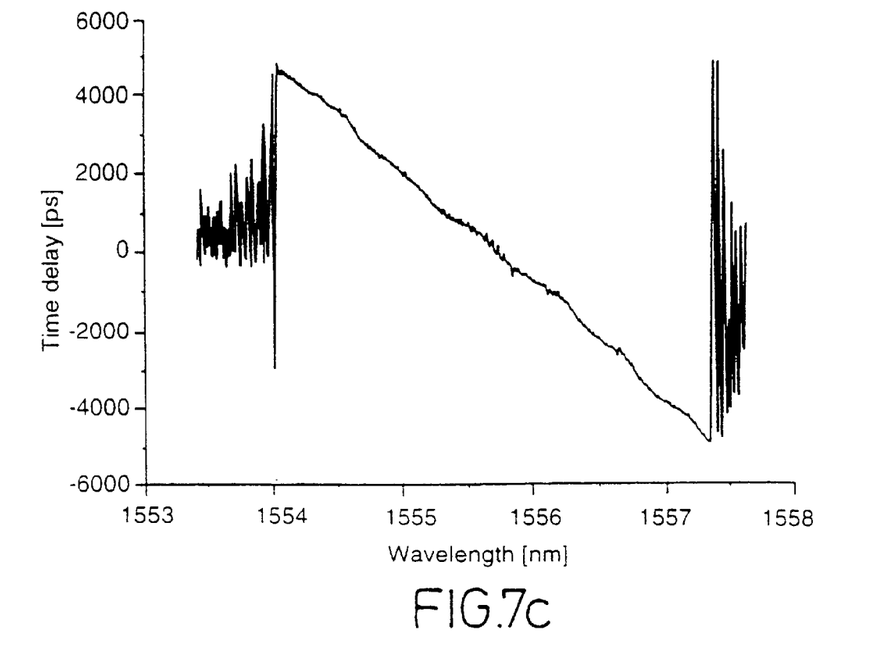
Figure 7D:
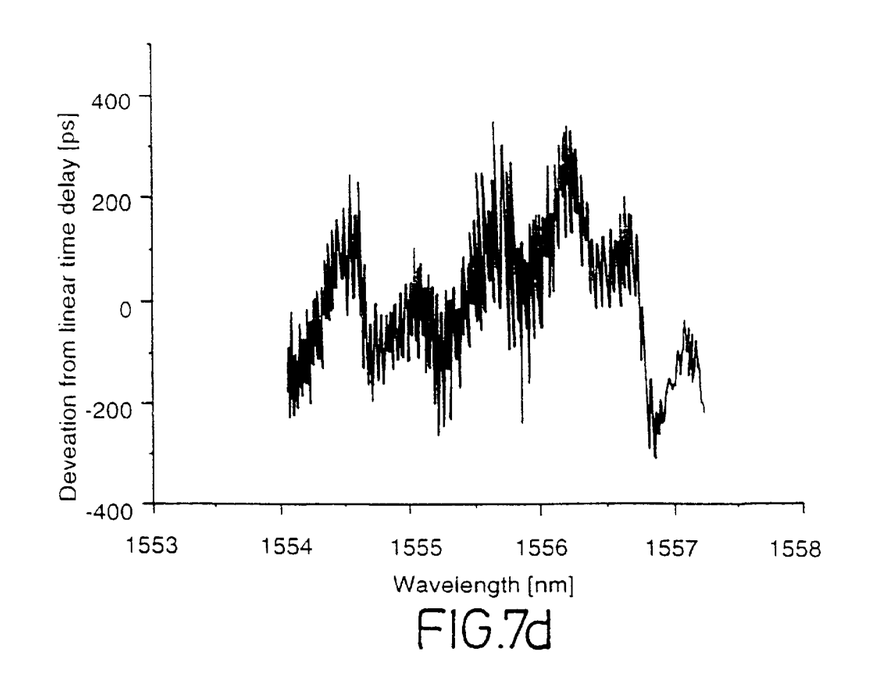

FIGS. 7a to 7d of the accompanying drawings illustrate problems which can occur in a nominally linearly chirped fibre grating. FIGS. 7a and 7c illustrate the reflection and time delay characteristics of the grating, and FIGS. 7b and 7d illustrate deviations from the expected characteristics.

This invention provides a method of detecting diameter variations in an optical waveguide, the method comprising the steps of fabricating a chirped grating in the optical waveguide of a known physical pitch; and measuring deviations from the expected time delay of the chirped grating.

The invention also provides a method of fabricating an optical fibre waveguide grating in a waveguide of nominally uniform diameter, the method comprising the repeated steps of: fabricating a grating section in a portion of the optical waveguide of a known physical pitch; measuring deviations from the expected response of the at least the most recently written grating section; and varying a grating parameter for writing a next grating section in dependence on the measured deviations for at least the most recently written grating section.

The invention also provides a method of fabricating an optical grating in a waveguide of nominally uniform diameter, the method comprising the step of varying a grating characteristic at positions along the grating in a substantially inverse relationship to the diameter of the waveguide at those positions.

The invention also provides an optical waveguide grating formed in a waveguide of nominally uniform diameter. in which a grating characteristic is varied at positions along the grating in a substantially inverse relationship to the diameter of the waveguide at those positions.

The invention is based on the new recognition that when fabricating fibre gratings in conventional, i.e. step-index fibre, that the reflection wavelength depends not only on the fibre NA numerical aperture, but also the fibre cut-off. This is because the reflective wavelength, $\lambda_B$ is given by $$2n_{\it eff}\Lambda_B$$

where $n_{\it eff}$ is the effective fibre index for the guided mode and $\Lambda_B$ is the actual period of the grating lines.

It has been observed that when drawing fibre, small fluctuations in the fibre diameter generally occur. For a nominal fibre diameter of 125 μm, diameter deviations as large as ±1 μm with a period in the range 100–200 mm (along the fibre) have been observed.

A step-index fibre has core index $n_1$ and cladding index $n_2$ (where $n_1 > n_2$ and $NA = \sqrt{n_1^2 - n_2^2}$). The effective index $n_{\it eff}$ depends on the proportion of the guided mode overlapping the core, η and can be expressed $$n_{\it eff} = \eta n_1 + (1-\eta)n_2.$$

The overlap parameter for a given fibre is documented for example in Snyder & Love.

For a typical fibre NA of 0.2, nominal diameter of 125 μm and cut off of 1250 μm a 1 μm diameter change causes a ~50 pm grating wavelength shift. As the diameter varies along the length of a grating, therefore, the response of the grating can deviate significantly from that which might be expected.

In the case of linearly chirped fibre gratings, the effect of these diameter fluctuations is to cause the time delay vs wavelength characteristic to deviate from a linear characteristic.

Within the broad overall aspect of the invention. several preferred techniques are proposed here to allow the fabrication of a desired grating in a non-uniform fibre. The first three techniques involve adjusting the written grating period $\Lambda_B$ to reduce the impact of the diameter fluctuation on $n_{\it eff}$. The fourth technique involves UV-pre or post-processing the fibre to adjust $n_1$ or $n_2$ in the region of the core along the fibre such that $n_{\it eff}$ becomes more uniform along the fibre. Obviously any combination of these methods could be employed. All of these methods can be incorporated into current grating fabrication techniques.

The invention will now be described by way of example only with reference to the accompanying drawings in which.

Figure 1:
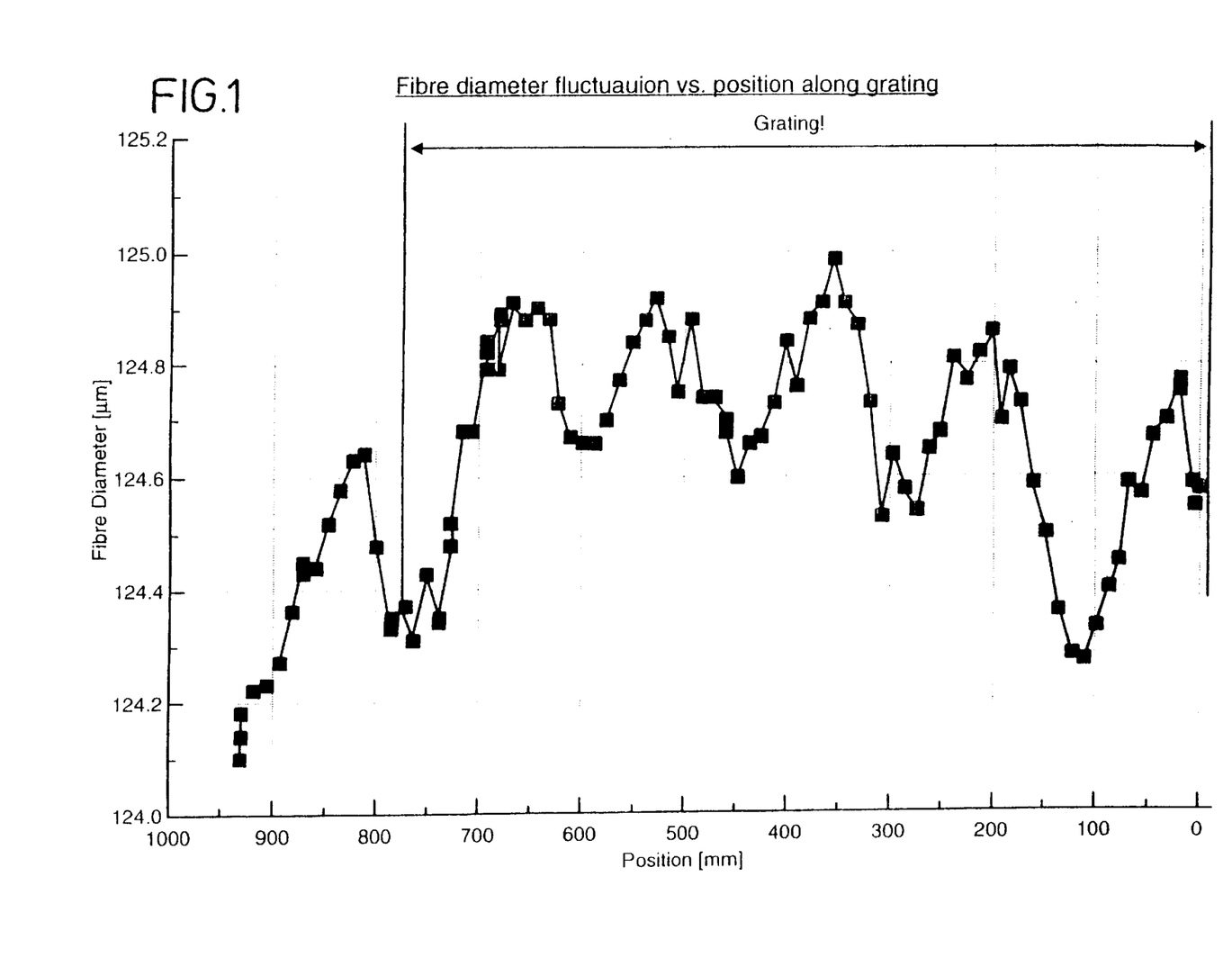
FIG. 1 is an empirical graph plotting the diameter of a sample of optical fibre against position along the fibre.

Referring now to FIG. 1, the diameter of a length of optical fibre is plotted against position along the fibre. The measurements were made using a commercially available fibre diameter measurement device having an accuracy of 150 nm and a repeatability of 50 nm.

FIG. 1 illustrates a substantially periodic variation in fibre diameter, with a peak-to-peak range of almost 1000 nm.

A length of the fibre used for grating fabrication (to be described below) is also marked on FIG. 1.

In order to assess the possible effects of this variation in diameter on the performance of a (supposedly) linearly chirped grating, in fact a series of linearly chirped gratings were superposed on one another in the length of the single fibre shown in FIG. 1. This ruled out any measurement artifacts or random effects through using different fibre lengths.

Figure 2:
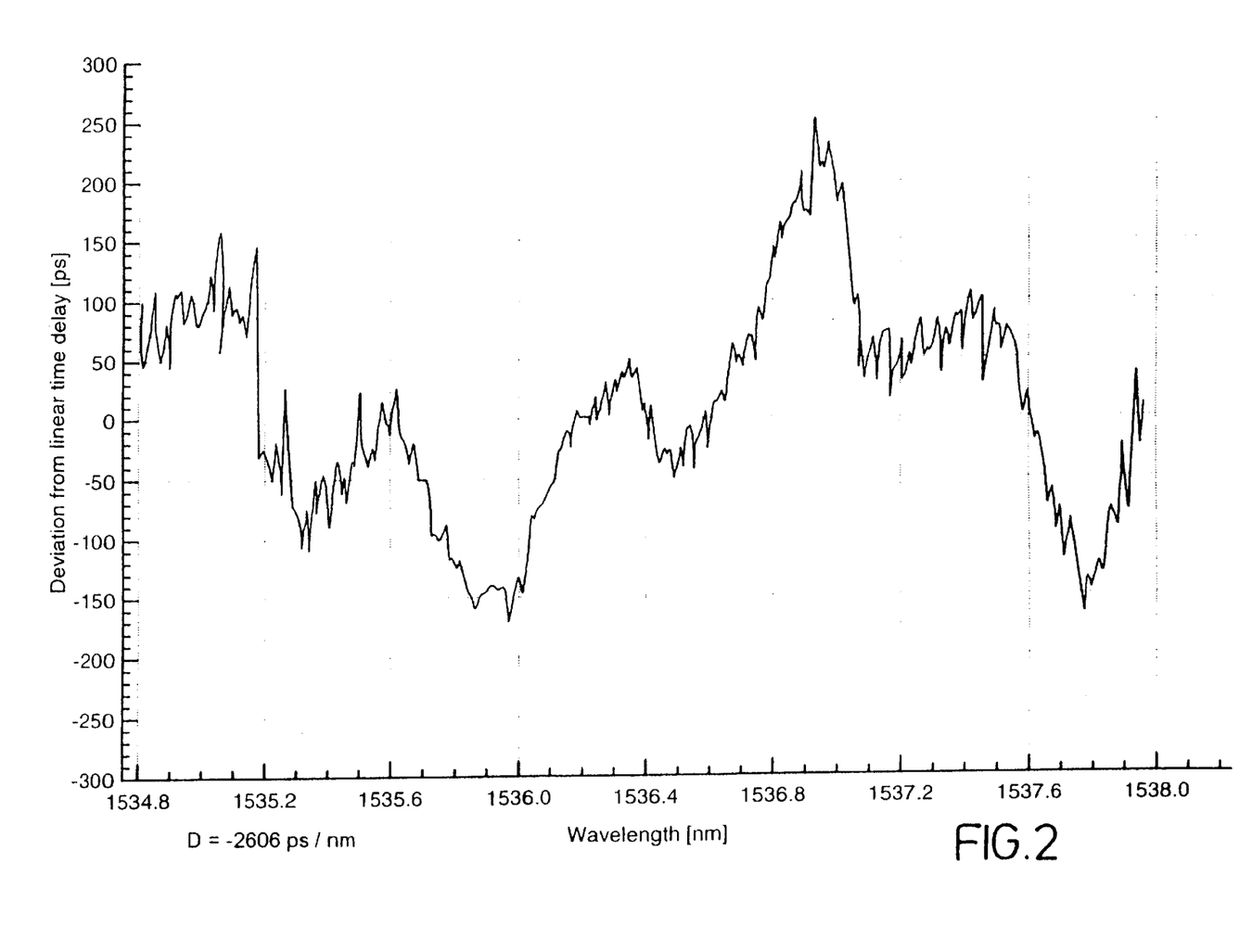
FIGS. 2 to 4 are empirical graphs showing the deviation from a linear dispersion characteristic of three respective gratings written into the sample of optical fibre.
Figure 3:
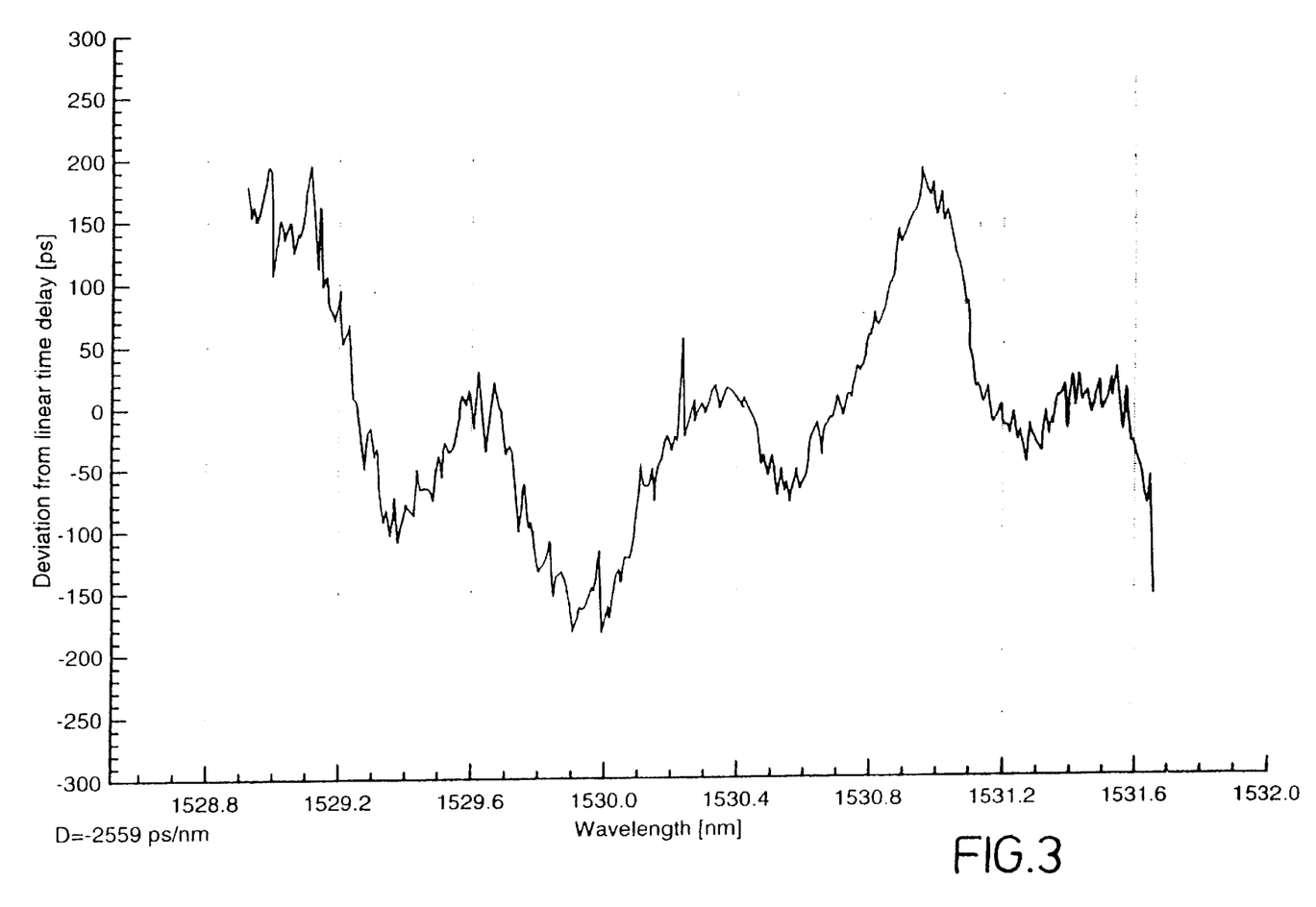
Figure 4:
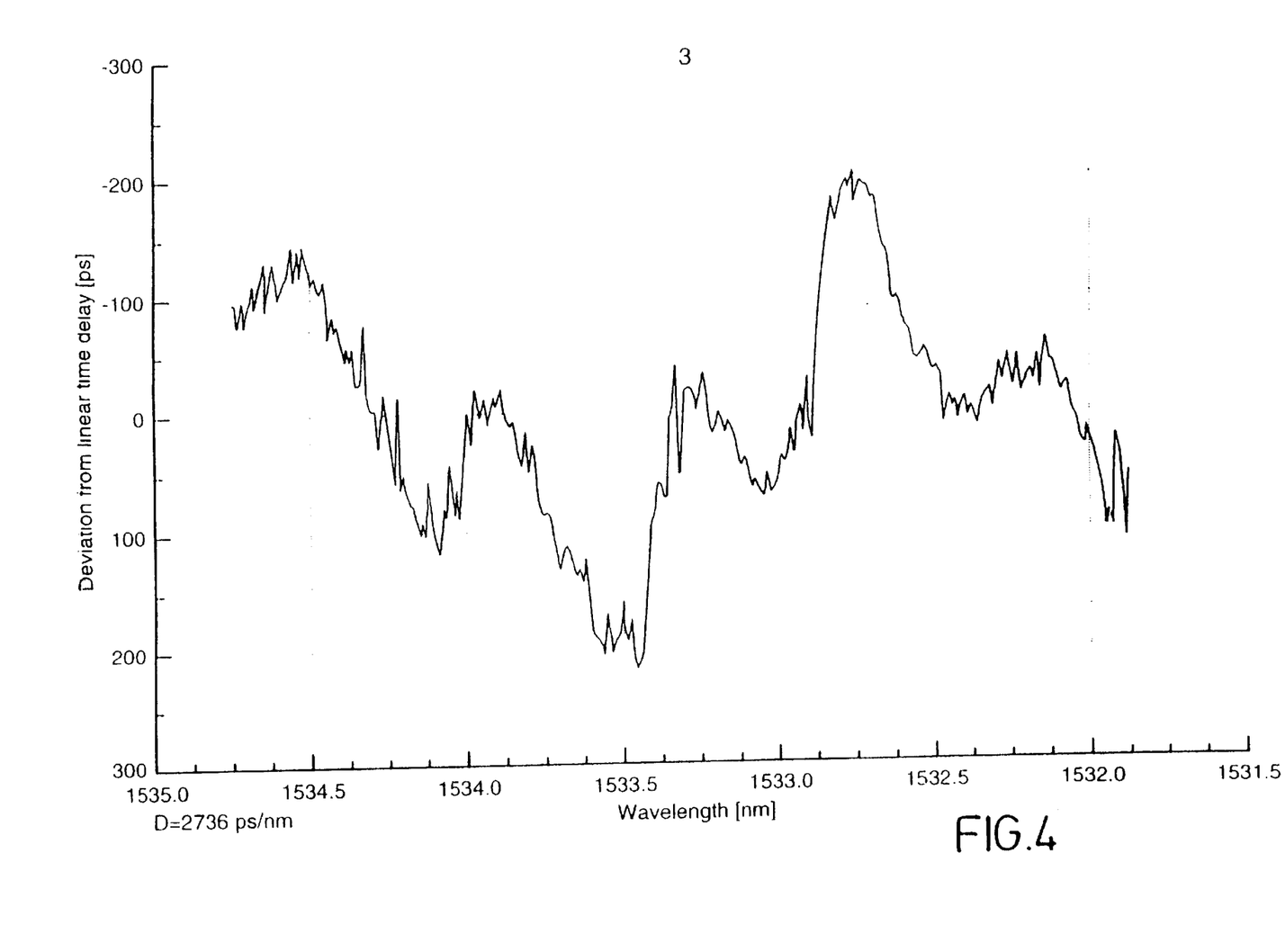

Two gratings were written with the same direction of chirp but a 6 nm offset, and measured time delay deviation characteristics from these are shown in FIGS. 2 and 3. FIG. 4 illustrates corresponding results for the third grating which had the opposite direction of chirp and a 3 nm offset from both of the other two gratings (i.e. at a mid-point between the two). The length of the grating is 85 cm and the dispersion is designed to compensate 150 km transmission in standard fibre.

The deviations from linear time-delay caused by the structure in the fibre imperfections are seen as substantially identical perturbations in the time delay characteristics of both the gratings written with same direction of chirp (FIGS. 2 and 3). For the third grating written with the opposite chirp direction. positive chirp, the perturbation to the time delay (FIG. 4) is not in fact identical to the time-delay deviation characteristics seen in FIGS. 2 and 3. It is postulated that the "direction" of the diameter fluctuations play an important role in the changes in the dispersion slope as well.

It should be noted that the axes of FIG. 4 have been reversed in order to show the "shape" of the dispersion in a similar manner to FIGS. 2 and 3.

By looking at FIGS. 2 and 3 it can be seen that deviation effects have been observed which are substantially independent of the grating centre wavelength and which correlate with the physical measurement of the fibre's diameter. Accordingly, a technique for detecting deviations in the physical diameter (rather than the absolute diameter itself) is as follows:

(a) write a weak test grating outside the wavelength band of interest into the fibre to be assessed; and (b) characterise the time-delay deviation for the test grating.

The test grating should be weak in order not to saturate the index, the strength of evaluation grating limits the strength of the "real" grating to be written on top after characterisation.

Certain precautions can improve the process of pre-evaluation of the fibre diameter fluctuations. These include noise reduction on the time delay characteristics, this condition is partially met by increasing the frequency on the network analyser thereby averaging more. The process of loading the obtained information about the wavelength position error in the fibre into the grating writing process is straight forward for the skilled man and will not be described in great detail here.

The cause of the diameter fluctuation is unknown for definite. When the diameter imperfections is generated in the drawing process. one scenario could be that there is an quasi-linear increase in the diameter as it is being drawn. This increase/decrease in diameter could be generated by certain drawing induced resonances. The diameter control mechanism. that is based on data coming from a which accuracy interferometric fibre diameter controller (e.g. an Anritsu measurement unit fitted on the drawing tower. with a 0.15 μm accuracy) could then cause an abrupt change/correction back to the correct diameter of the fibre. This correction position is then a function of the timing of the feedback.

In order to correct the errors in the dispersion characteristics caused by the change in the diameter, it is not necessary to know the absolute changes in the diameter, although in some embodiments these are measured physically, or even the relative changes, as these can just be inferred from the deviation from the expected performance of the test grating. What is necessary though is to know the position error for a certain wavelength. This information can be gained from the time delay characteristics of a linearly chirped grating by plotting the wavelength as function of position L, $\lambda_B(L)$, rather that time delay as function of wavelength, $\tau(\lambda_B)$. The time delay in the grating is given by $$\tau = \frac{2 \cdot n_{eff} \cdot L}{c} \quad (1)$$

where c is the speed of light in vacuum. A re-arrangement of the time delay value to a relative position value in the grating and a change of axis will then reveal $\lambda_B(L)$ instead of $\tau(\lambda_B)$. The slope of the curve is now the chirp rate ξ given by $$\xi = \frac{\Delta \lambda}{L} = \frac{2 \cdot n_{eff}}{c \cdot D} \quad (2)$$

where Δλ is the chirp and D is the dispersion of the grating. By plotting $\lambda_B(L)$ and by knowing the value of ξ, it is possible to determine the value ε of the position error for certain wavelength in a chirped grating because the positional deviation from the chirp rate is ε. In order to correct this effect the wavelength error for a given position is derived and because the variations in the fibre diameter is of a relatively low frequency the improvement in the gratings dispersion characteristics is quite evident.

In detail. some techniques for using the data gathered by the fibre characterising technique described above or by a measurement of physical fibre diameter are:

1. The desired grating is fabricated by modifying the written grating profile to take into account the diameter fluctuations such that the resultant grating is more ideal than would have been received without adjusting for the diameter fluctuations. In particular, the desired grating is written using a pitch variation adjusted in an inverse relationship to the measured deviation characteristics for the out-of-band grating. Many techniques are known for writing gratings with a pitch which is finely adjustable along the length of the grating—see for example GB9617688.8.

2. Some gratings are written sequentially along the fibre. The section that has just been written can be characterised effectively to determine its reflection wavelength. Comparison with the target wavelength gives an indication of the diameter error at that position along the grating. Since the diameter fluctuations have been found to exhibit a period in the region 10–20 cm, then providing the measurement position is close, e.g. ~1 cm to the writing position, the diameter error can be determined and corrected for "on the fly", i.e. as each orating section is written.

3. A third method proposes to simply measure the physical diameter fluctuations in the fibre prior to inscribing the grating. Thus the written period is modified to reduce the impact of the diameter fluctuations, by adjusting the pitch in an inverse relationship to the measured diameter fluctuations. The diameter should typically be determined with a resolution better than 0.1 μm, although lesser resolutions can still provide some useful results.

Figure 5A:
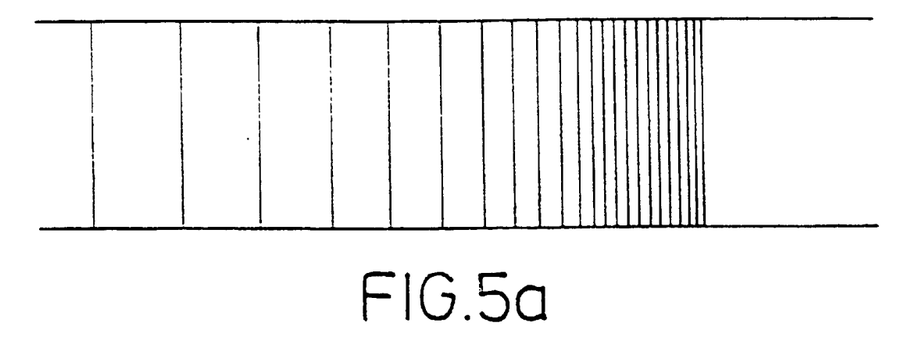
FIGS. 5a and 5b are schematic diagrams illustrating the compensation applied to a fibre of varying diameter.
Figure 5B:
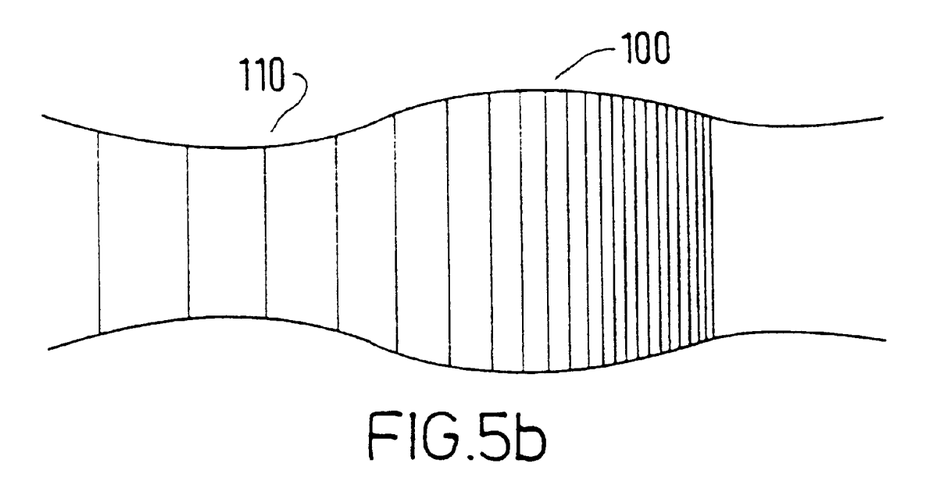

FIGS. 5a and 5b are schematic diagrams illustrating the compensation applied to a fibre of varying diameter. In particular, FIG. 5a schematically illustrates the variation in grating pitch along an ideal linearly chirped grating, and FIG. 5b illustrates the way in which the pitch is modified along the length of the grating using one of the techniques described above. At a region 100 the diameter is greater and so the pitch is smaller, and at a region 110 the diameter is less and so the pitch is larger.

4. In a fourth technique the desired grating is inscribed, nominally, assuming a certain, typically uniform fibre characteristic. The grating is then characterised to determine fluctuations in $n_{eff}$ along the fibre. Post processing of the fibre, typically via exposing the core region to differing UV fluence is employed to make the resultant $n_{eff}$ more uniform than it otherwise would be.

Figure 6A:
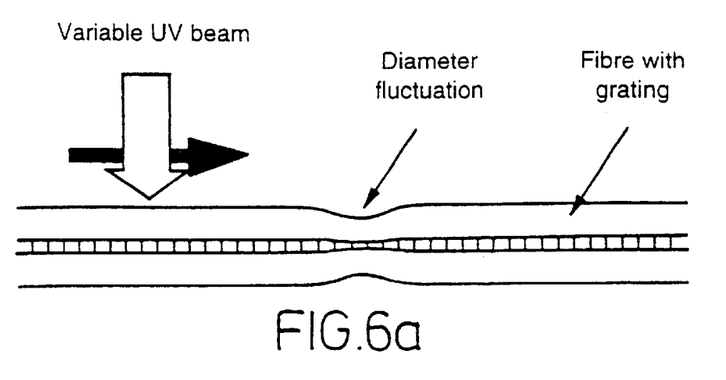
FIGS. 6a to 6c schematically illustrate a fibre post processing operation.
Figure 6B:
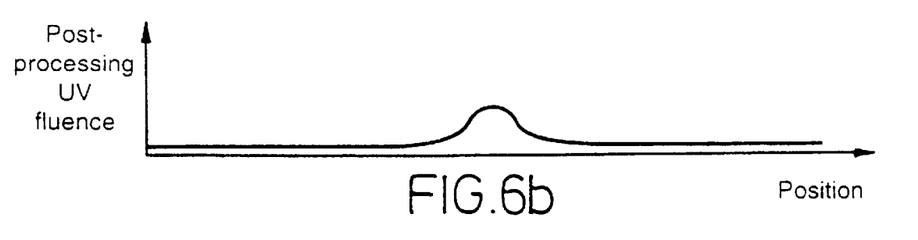
Figure 6C:
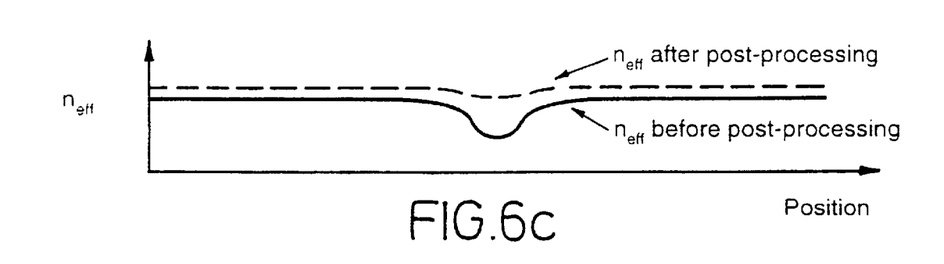

This fourth process is schematically illustrated in FIGS. 6a to 6c. FIG. 6a schematically illustrates a scanning grating fabrication technique on a fibre waveguide with a diameter fluctuation. A post processing UV beam is directed onto the region of the diameter fluctuation to change the average refractive index at that region, thereby making the effective refractive index ($n_{eff}$) more uniform. The post-processing beam could be a uniform beam or the grating writing beam, for example.

What is claimed is:

1. A method of detecting diameter variations in an optical waveguide, the method comprising the steps of:
   (i) fabricating a chirped grating in the optical waveguide of a known physical pitch;
   (ii) measuring deviations from the expected time delay of the chirped grating, wherein deviations from the expected time delay relate to diameter variations in the optical waveguide; and
   (iii) fabricating a further grating in the optical waveguide, wherein a pitch of the further grating is varied at positions along the grating in a substantially inverse relationship to the diameter of the waveguide at those positions.

2. A method according to claims 1, in which the waveguide is an optical fiber.

3. A method according to claim 1, in which the firstmentioned grating and the further grating operate in different wavelength regions.

4. A method according to claim 1 or claim 3, in which the firstmentioned grating is weaker than the further grating.

5. A method according to claim 1, in which:
   at least a part of the waveguide is photosensitive; and
   the firstmentioned grating is fabricated by exposing the waveguide to a writing light beam.

6. A method according to claim 5, comprising the step of varying the exposure to the writing light beam at positions along the grating in relationship to the diameter of the fiber at those positions.

7. A method according to claim 5, comprising the step of selectively exposing a further writing light beam at positions along the grating in relationship to the diameter of the fiber at those positions.

8. A method according to claim 3, in which the firstmentioned grating is weaker than the further grating.

9. A method of fabricating an optical fiber waveguide grating in a waveguide of nominally uniform diameter, the method comprising the repeated steps of:
   fabricating a grating section in a portion of the optical waveguide of a known physical pitch;
   measuring deviations from the expected response of the at least the most recently written grating section, wherein the deviations from the expected time delay relate to diameter variations of the optical waveguide; and
   varying a grating pitch for writing a next grating section in dependence on the measured deviations for at least the most recently written grating section.

* * * * *